(12) United States Patent
Venkataraman et al.

(10) Patent No.: US 11,488,271 B2
(45) Date of Patent: Nov. 1, 2022

(54) SYSTEM AND METHOD FOR SUPPLIER INFORMATION MANAGEMENT

(71) Applicants: INTERNATIONAL BUSINESS MACHINES CORPORATION, Armonk, NY (US); Chainyard Supplier Management, Inc., Morrisville, NC (US)

(72) Inventors: Mohan Venkataraman, Morrisville, NC (US); Sai Nidamarty, Morrisville, NC (US); Shyam Charit Adivi, Morrisville, NC (US); Alex Rosen, Morrisville, NC (US); Gary Storr, Morrisville, NC (US); Stephen John Rogers, Raleigh, NC (US); Derek Lamar Harrison, Chapel Hill, NC (US); Vishnu Praneeth Tadepalli, Cary, NC (US); Daniel J. Schaefer, Raleigh, NC (US)

( * ) Notice: Subject to any disclaimer, the term of this patent is extended or adjusted under 35 U.S.C. 154(b) by 201 days.

(21) Appl. No.: 16/161,996

(22) Filed: Oct. 16, 2018

(65) Prior Publication Data

US 2020/0118234 A1    Apr. 16, 2020

(51) Int. Cl.
*G06Q 50/26* (2012.01)
*H04L 9/08* (2006.01)

(52) U.S. Cl.
CPC ......... *G06Q 50/265* (2013.01); *H04L 9/0819* (2013.01)

(58) Field of Classification Search
CPC ............. G06Q 2220/00; G06Q 20/401; G06Q 20/3674; G06Q 30/0201; G06Q 10/087; G06Q 20/405; G06Q 30/0215; G06Q 20/223; G06Q 50/265; H04L 9/0819; H04L 9/0894; H04L 9/0863; H04L 2209/56; H04L 9/3239; H04L 2209/38
See application file for complete search history.

(56) References Cited

U.S. PATENT DOCUMENTS

| 11,055,713 | B1* | 7/2021 | Dowling | G06Q 20/3829 |
| 2014/0236025 | A1* | 8/2014 | Sheldon | A61B 5/0205 600/483 |
| 2017/0220998 | A1* | 8/2017 | Horn | H04L 51/52 |
| 2017/0300898 | A1* | 10/2017 | Campero | G06Q 20/3676 |
| 2018/0232828 | A1* | 8/2018 | Joao | H04L 9/0637 |
| 2018/0262493 | A1* | 9/2018 | Andrade | H04L 63/0861 |
| 2019/0014176 | A1* | 1/2019 | Tormasov | G06F 11/0727 |
| 2019/0318433 | A1* | 10/2019 | McGee | H04L 9/0643 |

(Continued)

*Primary Examiner* — Neha Patel
*Assistant Examiner* — Chunling Ding
(74) *Attorney, Agent, or Firm* — John L. Sotomayor (57) ABSTRACT

This document presents a system and method for presenting vetted and verified Supplier information to Buyers. The Know Your Suppler (TYS) Application collects previously vetted and verified Supplier information and commits the collected information, verification authorities, verification details, and transaction information to a shared distributed ledger implemented as a privately permissioned blockchain. Buyers who want to onboard a newly identified Supplier, or update Supplier information with more recently verified information records, may subscribe to the TYS Application and purchase available vetted and verified Supplier information to optimize the onboarding or updating process for Suppliers from whom the Buyer wants to purchase goods or services.

10 Claims, 7 Drawing Sheets

(56) References Cited

U.S. PATENT DOCUMENTS

| | | | |
|---|---|---|---|
| 2019/0379797 A1* | 12/2019 | Sahagun | H04N 1/00241 |
| 2020/0026834 A1* | 1/2020 | Vimadalal | G06F 16/9024 |
| 2020/0118086 A1* | 4/2020 | Achkir | H04L 63/105 |
| 2021/0264018 A1* | 8/2021 | Helles | G06Q 20/363 |

* cited by examiner

SYSTEM AND METHOD FOR SUPPLIER INFORMATION MANAGEMENT

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Buyers and Suppliers have complex contractual relationships that are based upon the course of business transacted between the corporate entities. These contractual relationships are based upon shared information that has been provided to a Buyer from a Supplier during the process of onboarding a new Supplier for each Buyer. The information provided is typically in the form of questionnaires that have a series of questions that attempt to assure a Buyer that the Supplier is capable of executing on purchasing contracts in a timely and effective manner. The process of answering the questionnaires can include verification steps to ensure that the answers provided are accurate and trustworthy. The information requested may also require information to be provided from third party sources, other than verification entities, that have no direct connection with the Buyer and Supplier.

Onboarding a new Supplier is not a process that is undertaken lightly. The process can consume hours of effort over several months in order to gather and verify all of the information that may be required by a Buyer. The result is a trusted relationship between the Buyer and Supplier in which each party may have some assurance that contracts entered into by the parties will be honored in that goods and services will be supplied and payments will be made and received in a timely fashion.

The trusted relationship between a Buyer and Seller may be built up over the course of doing business, or it may be facilitated by optimization steps put in place by each Buyer and Seller in an effort to minimize the time to onboard a new provider. In the current state of the art, Buyers may have some processes to optimize this process, however, the onboarding process is still a long and complex process.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

As used herein, the term "blockchain" refers to a shared ledger system that may be privately or publicly provisioned, such as, in a non-limiting example, Hyperledger created by International Business Machines (IBM).

As used herein, the term "workflow" is defined as the sequence of steps to be performed in order to execute each governance process including touchpoints with various systems and tools.

As used herein, the term "Change and release management" is defined as the process by which changes to the process, methods, tools, and the various components of the blockchain are recommended, processed and adopted. Changes can apply to network configurations, smart contracts, access control, feature enhancements, voting rights, phased availability of new features, bug fixes, enhancements to the platform based on defined schedules, as well as managing changes to other portions of the system as implemented.

As used herein, "audit and controls" defines all of the tools and know-how required to establish audit and controls, logging and reporting on audit points, interfaces to audit manually or through automatic means, and triggers to audit on-demand or periodically.

In an embodiment, a shared ledger, such as that implemented in a blockchain, may operate across multiple diverse parties in a procurement business scenario such as suppliers, buyers, validators, verifiers, auditors and 3rd parties. In this non-limiting example, verifiers/validators may selectively access information provided by any supplier and validate the provided information against one or more additional information sources to establish trust and present the verification record to the buyer seeking to onboard the supplier into their procurement organization. In a non-limiting example, a bank may selectively access supplier account information and may verify whether the suppliers claim of having a bank account no is true or not. This verification step limits bad actors who are attempting to siphon money from the buyer to other accounts controlled by said bad actors, thus reducing the threat and possibility of fraud.

System Elements:

The Supplier Information Management (SIM) system is implemented between two parties, typically organizations, that are engaged in one or more commercial transactions. In an embodiment the two parties may be an individual or organization that is attempting to purchase goods and/or services, the buyer, and an individual or organization that is desirous of selling goods and/or services to the buyer, known as the seller. The SIM system is structured to optimize and facilitate transactions between a buyer and a seller both from the standpoint of vetting and verifying information about each party to the other party, and from the standpoint of maintaining data security and guarding against fraud and fraudulent transactions.

In an embodiment, the SIM platform may create a digital identity or a digital passport for business entities, buyers and sellers, by capturing information the information that is company specific, industry specific, geography specific, and buyer and/or seller specific on a defined blockchain for the SIM system. The SIM system may have various certification agencies and/or third-party validators with appropriate permissions selectively access the information on the shared ledger. The SIM system may then verify the information that a business entity has provided is accurate. This pre-verified information can be readily shared with the buyers/business partners who wish to engage with the suppliers in a business relationship. Providing such pre-vetted information to a party wishing to engage with a supplier may save the party receiving the pre-vetted information money, cycle time to onboard, minimize the risk of working with an un-documented supplier, and overall building trust between buyer and supplier.

Additionally, the SIM platform may enable additional personas and entities that contribute to the identifying, verifying, and optimizing transactions between a buyer and a seller. The process of vetting and verifying information supplied by a seller is performed by a Verifier persona implemented within the SIM system. In a non-limiting example, a Verifier or Certifier may be instantiated when information is received from an entity, such as a seller. Verifiers/Certifiers have the ability to use the system to perform their certification process and host/distribute their certifications. The Verifier/Certifier may then perform an automatic pre-verification and/or pre-validation of supplier profile information via trusted external information verifiers and/or information certifiers. The Verifier persona may then receive the results of the verification and/or validation action and commit this data, and the transaction that compiled this data, to a purpose built blockchain.

In an embodiment, the SIM system would maintain pricing model protection for those verifiers and certifiers who supplied verification and/or validation information about the supplier to the SIM system. The SIM system may also place information about certifiers on the blockchain and associate the certifier with the data for which the certifier has provided certification information. The SIM system is active to track all access to information in the blockchain, maintaining a record of the value of the information that has been contributed by each certifier. The tracking algorithm implemented in the SIM system tracks all participation of certifiers, thus tracking how much information supplied by each certifier is being used and compensating each certifier organization or entity for use of data that has been committed to the blockchain.

Although the data supplied to the SIM system from a supplier is validated and verified, the ownership of the data supplied remains with the supplier. The SIM system instantiates a sharing algorithm for all incoming data that brands or identifies received data to a particular owner, in this non-limiting example the owner would be a supplier providing a data profile for vetting by the SIM system. The algorithm may hash the incoming branded profile information utilizing a proprietary hash algorithm or other available hash algorithm. The hashed data may then be encrypted. The hashed and encrypted data may then be committed to the blockchain along with an indication of ownership. In this fashion, the SIM system may retrieve and/or grant access to subsets of data based upon the granting of permission by the owner of the data subset.

In an embodiment, the SIM system enables the definition and creation of analytical results through one or more analytics providers. An analytics provider may be an internally created module as part of the SIM system, or may be an external resource. Analytical results may take the form of analyzing incoming and stored data to create a complete and robust understanding of Supplier and Buyer needs. An analytical provider may also be engaged to create one or more digital fingerprints for suppliers and buyers that have utilized the SIM system.

In an embodiment, additional personas may be established within the SIM system that represent Auditors and/or Regulators. Auditors and Regulators will provide input that permits the SIM system to comply with data protection and data privacy regulations.

In an embodiment, the SIM system enables transactions on both sides of any commercial transaction. A non-limiting example of a commercial transaction is the communication between a buyer and a supplier when a buyer wants to onboard a new supplier from whom they have not previously purchased goods and/or services. To initiate and enable commercial transactions between a buyer and a new supplier, the SIM system may provide services that perform supplier and buyer discovery, filtering and prospecting.

In an embodiment, the SIM system may first accept a request from a Buyer to facilitate the onboarding of a new Supplier. The SIM system retrieves details about the business entity that is the Buyer from storage. The SIM system may retrieve information from the blockchain to the extent that the role and permissions for the Buyer allow. The retrieved information may be decrypted and provided to the Buyer for verification and/or update. The SIM system may also retrieve and present to the Buyer responses to a questionnaire that have been provided by a Supplier, once again the data retrieval is based upon Buyer permissions for access to the data. The Buyer may also request verification data provided by the Supplier or an accredited verifier, also based upon Buyer permissions for data access. The data retrieved for each Buyer may be used to populate a template of commonly requested Supplier information. Alternatively, a Buyer may submit a set of data queries that are customized for each Buyer. The SIM system may categorize data sets and retrieve data sets that are frequently requested, or, alternatively, the Buyer may provide a request for data from a Supplier or directly from a certifier that meets the Buyers particular needs. In this fashion, the SIM system may optimize the retrieval and vetting of supplier information to the Buyer to assist in more quickly vetting and onboarding a Supplier.

The Supplier in this commercial transaction for onboarding may submit to the SIM system responses to validate the existence of the Supplier as a business entity and enables the registration of the Supplier to the SIM system with valid credentials. The SIM system may record and save the information provided with a questionnaire from the Supplier on the blockchain. Additionally, the SIM system may record a verification against the Supplier provided by a valid and trusted verifier attesting to the factual accuracy of the data submitted by the Supplier. Such data received from the Supplier may include basic information about the Supplier, answers to questions posed in the questionnaire, public verifications about the Supplier, notifications, completed templates, if available, and any user and role information for individuals employed by the Supplier that will have access to the SIM system.

The SIM system provides blockchain enabled smart contracts to facilitate transactions between entities engaging in a commercial transaction. In this context, contracts may be provided that are digitized versions of legal business agreements that the participating entities in a business network, such as the business network enabled by the SIM system, have verified and to which they have agreed. Contracts available through the SIM system are modeled in a language such as, in non-limiting examples, Javascript or Golang or other and are active on every node on the blockchain within the same channel. Keeping contracts simple, small, focused, and aligned to purpose, role and permissions provides for greater control and management of contracts in the SIM system. Contracts currently available in the SIM system include, but are not limited to, entity contracts, verifications contracts, and transaction settlements contracts.

In an embodiment, entity contracts provide all the functions necessary to record and query business entity data around suppliers. This contract may enable each supplier to record information and permit buyers to query for such recorded information using a "Role Manager" persona. Verifications contracts provides functions to record and query verifications, verification history and audits against a supplier. Verifiers use functions to record verifications while buyers use functions to query and share verifications. Transaction Settlements contracts provide functions to collect payments and make appropriate disbursements to the various participants in a transaction based upon business rules. The participants may include, but are not limited to, the buyer, supplier, verifier, analytics providers, investors, network operators and third-party service providers. Additional contracts will become available as necessary to support additional transactions by the SIM system.

The SIM system may also connect to applications that are outside of the system through one or more Application Programming Interfaces (APIs). Connections to application and/or information suppliers such as, in non-limiting examples, Dunn and Bradstreet (D&B), Thomson Reuters, and additional suppliers may be provided as necessary to support the optimization of transaction verification and processing between parties to a commercial transaction.

In an embodiment, additional functionality may be provided through integration with third-party entities. Such third party entities may represent functions, such as payment processing, to whom users of the SIM system may be provided access to optimize system processes.

In an embodiment, the SIM system may be configured to provide the service of a double-blind supplier vetting through the integral Trust Your Supplier (TYS) Application. In this embodiment, a supplier may have provided the answers to a supplier questionnaire to a Buyer 1. Buyer 1 vetted and certified all of the information provided in the questionnaire prior to purchasing goods and services from the supplier. Buyer 1, as a member of the TYS network, may provide the vetted and certified information from the supplier to the TYS Application in a template form. A Buyer 2 may wish to purchase goods and services from the same supplier and contacts the TYS Application to request and acquire vetted and certified information about the supplier rather than going through the entire process of vetting and certifying all of the supplier information directly from the supplier and certifiers. Buyer 1 may share the vetted and certified supplier information stored and managed by the TYS Application with Buyer 2 through the TYS Application. Buyer 1 and Buyer 2 are not known to one another. The TYS Application permits Buyer 2 to purchase the vetted and certified supplier information acquired by Buyer 1 and deposited with the TYS Application. Buyer 2 purchases the supplier information and Buyer 1 receives a credit with the SIM system to be redeemed later. The TYS system is active to push identity information from a Supplier to a Buyer as well.

In this embodiment, the transaction is double blind, but each party receives a benefit from the transaction. Buyer 2 optimizes the time and cost required to onboard the supplier, and Buyer 1 receives a credit with the TYS Application that may be used for their benefit in future transactions. The TYS Application, for managing the vetted and certified data in the TYS repository and TYS shared blockchain, and facilitating the transaction receives a transaction fee from both Buyer 1 and Buyer 2. In this fashion, the TYS Application provides oversight and management of Supplier certification, committing immutable transactions to the shared TYS blockchain and Off-chain data stores as needed to provide for data security, secure transaction provenance, and vetted and verified Supplier information.

In an embodiment, the SIM system platform provides for additional communication and operational capabilities. The platform contains an Artificial Intelligence (AI) engine to provide for actions that may be aided through the use of the AI engine. In a non-limiting example, upon change in a supplier's information that is presented to the system, the AI engine may utilize cognitive capabilities to automatically classify risk level and then notify buyers connected to that supplier based on their notification thresholds. The AI engine may also provide the capability to actively notify Suppliers when they need to update the Supplier information that is held in the system repository and on the blockchain. The AI engine may look for supplier's information on the web and from selective information sources and media. Upon discovering differences, the AI engine will alert the affected suppliers on changes to be made to their profile as it finds profile changes from the profile maintained on the blockchain. This notification may be transmitted as a push notification to each Supplier informing them to update information through an Intelligent API. As a portion of the tracking of Supplier information within the SIM system, a clear trail of the Supplier provenance for all changes to their profiles and committed Supplier information is maintained by the SIM system. As an additional capability, the AI engine may be active to match Buyers and Suppliers for targeted advertising recommendations. The AI engine may also provide an analysis of all Supplier provided information against Buyer expressed needs to source which Suppliers might be a good match for Buyers and provide an indication to Buyer members of the possible match. The AI engine could then provide the Supplier identification to the Buyer members should they indicate an interest and the Buyer member could then proceed to the Supplier onboarding process.

In an embodiment, the SIM system may also provide privileged access tracking and reporting capabilities. Each Supplier that is a member of the network managed and maintained by the SIM system controls their own digital identity and owns their own information. Each Supplier may transmit verified data and verification results to the SIM system and/or permit the transmission of verified information directly from verification providers. In each situation, the verified information will be placed on the blockchain and in the appropriate data store and associated clearly with the Supplier. The tracking and reporting capabilities of the SIM system also provide for billing users and paying sources of privileged information.

In an embodiment, the control and management of the data on a blockchain and in a secure data store facilitates Audit capabilities for members of the SIM system. The SIM system may provide information as well as the provenance of all provided information to authorized third parties for the purposes of auditing the information and the entity to whom the information belongs. When a Supplier or other member of the SIM system wishes to share information with a third party, such as an auditing entity, the Supplier may share the information in a controlled manner through the blockchain. The SIM system may issue keys, in the form of tokens, to the third-party audit entity. The keys will permit the third-party to request information from the blockchain or off-chain data store that is associated with the Supplier, and receive information not only about that Supplier in particular, but also limit the information provided to only that information that the Supplier permits the third-party to access. In this embodiment, the SIM system may provide analysis and insights on buyer and supplier behavior, compliance and/or risk status for those business entities that are members of the SIM system.

In an embodiment, the SIM system may also permit the creation of a rating system for Suppliers who are members of the SIM system. The rating system may permit Buyers, Auditors, and other parties to have a relative measure of the trustworthiness, timeliness, and other execution capabilities of each Supplier relative to other Suppliers who are members of the SIM system. This rating system may be represented as a score or other relative scale, and may be provided to business entities, such as Suppliers, upon request. Additionally, the SIM system may provide the capability to send push notifications from one-member organization to another member organization within the SIM system. The SIM system may provide qualifications and business rules under which such push notifications may be filtered or otherwise managed.

In an embodiment, the SIM system AI engine may be active to provide a workflow analysis and notification to ensure that all certifications, and all portions of each certification that may be required to properly qualify a Supplier are complete. The Workflow could present a display of all of the certifications that may be required and populate check boxes as the verification for each certification is received by the SIM system.

In an embodiment, the disclosure herein presents a system and method for digital identity management, a server managing one or more distributed ledgers. The server may be active to receive and aggregate business information and verification information associated with the business information from business organizations, where the business organizations may be Buyers, Sellers, or other business organizations. The server may commit the business information and associated verification information to one or more distributed ledgers, where the distributed ledgers may be one or more blockchains controlled and managed by the server. The server may provide controlled access to a first business organization to combined information supplied by a second business organization. In this embodiment the combined information may be composed of business information and verification information provided by the second business organization, one or more verification entities, and/or third-party information providers.

In an embodiment, the business information may consist of answers to questionnaires about business capabilities, and the verification information is composed of evidence verifying and attesting to the accuracy of said business information. In this embodiment, controlled access may be composed of providing such access through a commercial transaction between a first business organization and a second business organization where such commercial transaction is managed by the server. The server may return business information, verification information, and other third-party information retrieved from the one or more blockchains in a template format. Additionally, the controlled access is implemented by generating a set of one-time use encrypted keys and providing one-time use encrypted keys to the first business organization.

Figure 1:
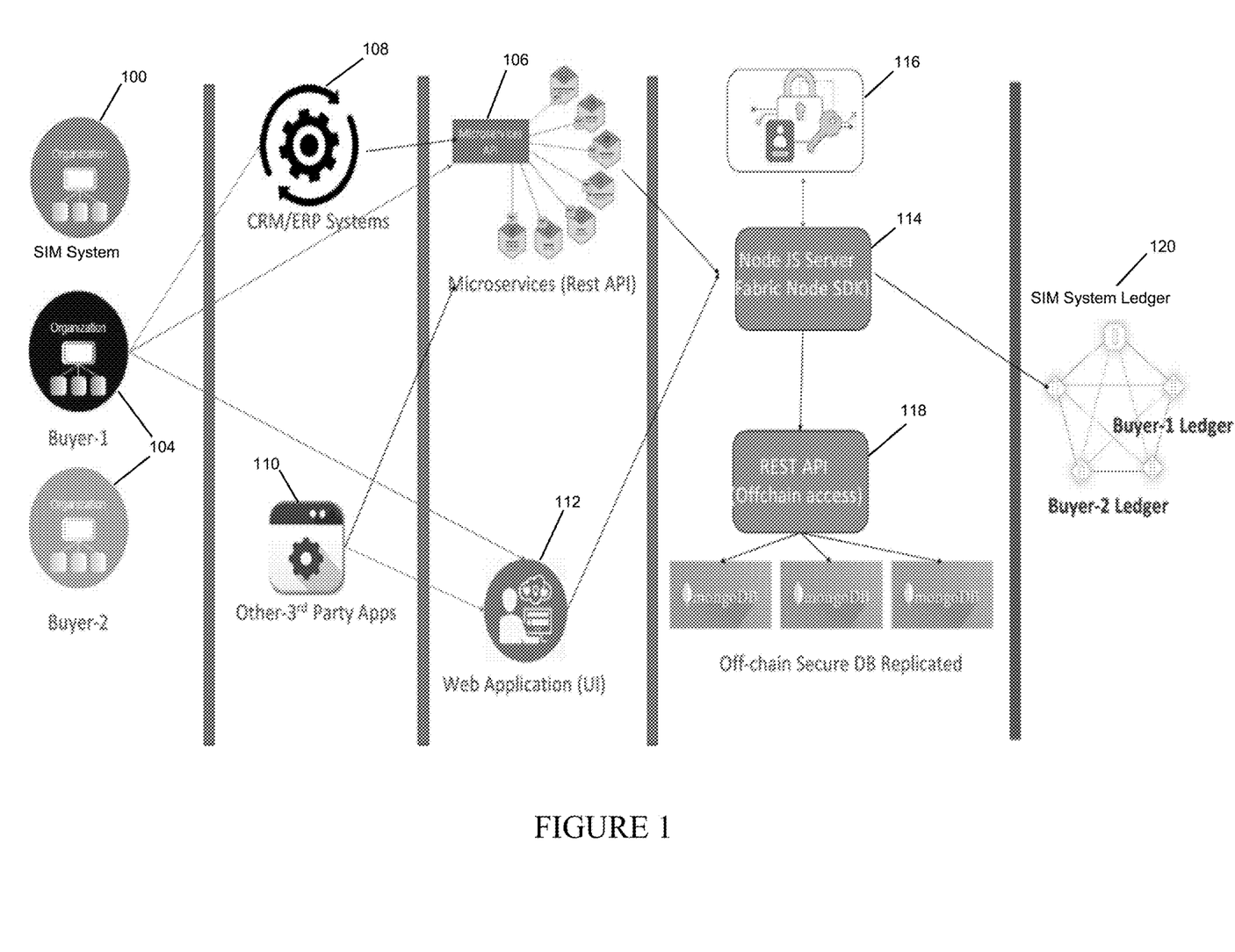
FIG. 1 is a view of the SIM system end-to-end system architecture consistent with certain embodiments of the present invention.

Turning now to FIG. 1, this figure presents a view of the SIM system end-to-end system architecture consistent with certain embodiments of the present invention. In an exemplary embodiment, the SIM system 100 is created as a network of users such as Buyers 104 that provide information to and request information from the SIM system 100. Information from organizations such as Buyers 104 and Suppliers (not shown) may be provided to the SIM system 100 through microservices 106 that are accessible to contributors to the SIM system 100. The microservices 106 are accessed through a REST API that provides for fast performance, reliability, and the ability to grow, re-using components that can be managed and updated without affecting the system as a whole. In a non-limiting example, information may be provided to the SIM system 100 from Customer Relationship Management (CRM) systems 108 and from other Third-Party applications 110, and other information resource applications. Additional interaction with the SIM system 100 may be provided to registered users through a Web Application 112 that provides a user interaction capability between organizations interacting with the system, microservices 106 available through the system, and permits access to the SIM Node server 114. The SIM node server 114 may only be accessed through a locking encryption module 116. The locking encryption module 116 is responsible for creating a secure database of all information that is presented to and stored within the SIM system 100. The SIM node server 114 may provide access to one or more external data repositories where the secure database may be replicated to provide for backup and recovery operations. The secure database may be maintained off the blockchain through a database REST API 118 which performs the replication, storage, and retrieval of the off the blockchain secure database. Information that is provided to the SIM system 100 by whatever input means may be placed within one or more distributed ledgers 120 (blockchains) where both the information and transactions committed against the information are placed within the privately provisioned blockchains and maintained and managed by the SIM system 100.

Figure 2:
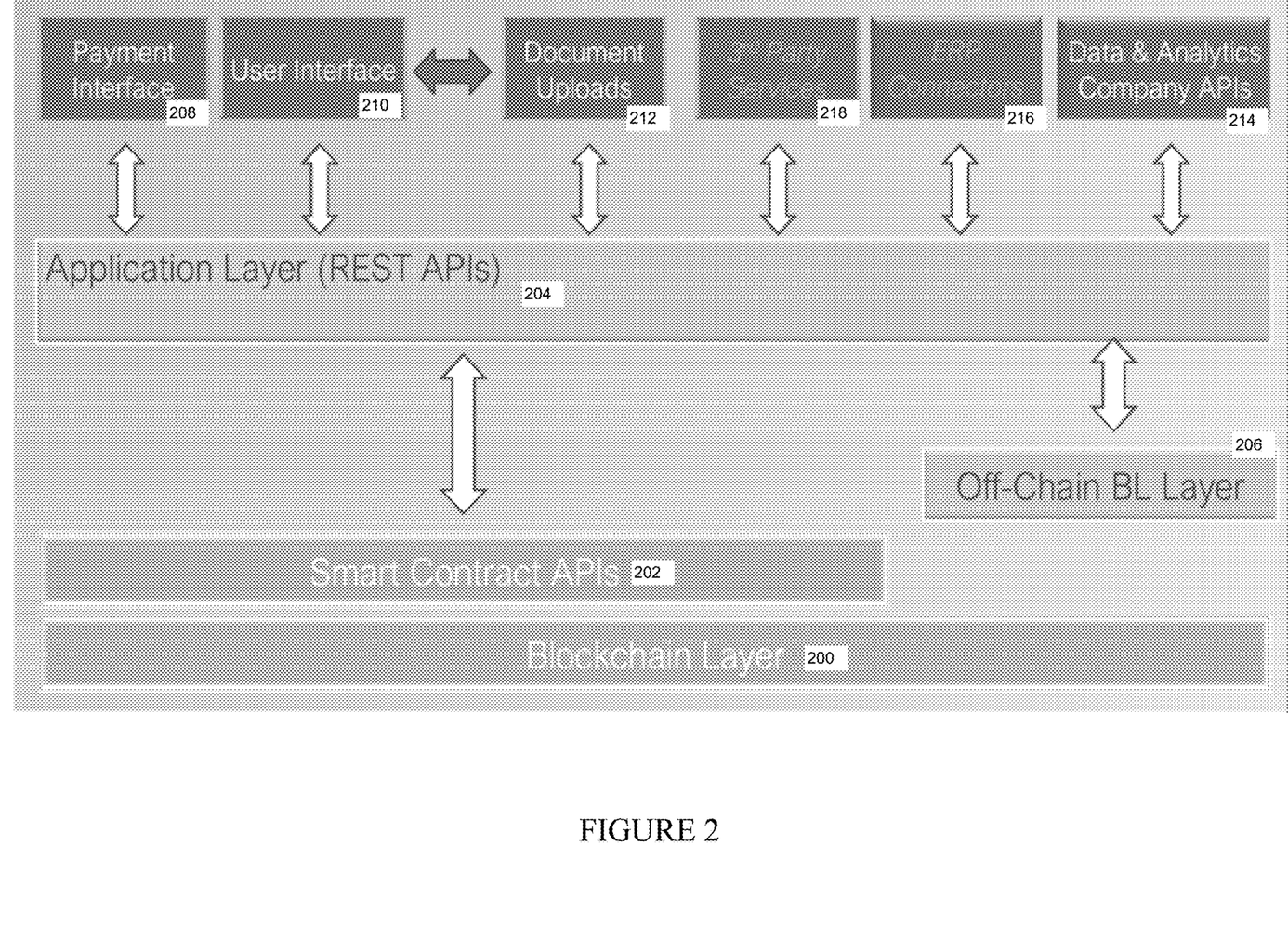
FIG. 2 is a view of the application architecture overview and roadmap for data communication and management consistent with certain embodiments of the present invention.

Turning now to FIG. 2, this figure presents a view of the application architecture overview and roadmap for data communication and management consistent with certain embodiments of the present invention. In an exemplary embodiment, the figure presents the communication pathways between components of, and information suppliers to, the SIM system 100. The blockchain layer 200 provides the underlying capability to operate and manage blockchain software and protocols for information and transactions that require immutable transactions on the ledger. The smart contract APIs 202 provide the functions coded on the blockchain to execute business rules and perform operations on the ledger. The smart contract APIs 202 are in data communication with the Application layer 204, which is implemented as a plurality of REST APIs, and the blockchain layer 200.

In an embodiment, an off-chain blockchain layer 206 may also be in data communication with the Application layer 204. The off-chain blockchain layer 206 is implemented as a NOSQL database used as an application cache, securely stores Personally Identifiable Information (PII) data, and non-blockchain related data that does not require immutable transactions on the ledger.

In an embodiment, the Application layer 204 may provide a plurality of data communication APIs with functions implemented in the SIM system. The Application layer may connect to a payment interface 208 that connects the SIM system to payment services allowing the system to accept subscriptions and other payments. A user interface 210 may be present to provide a registered user with access to the application functions and drives the workflow for the system. A document upload 212 interface may enable uploading, encrypting and securely storing documents in a document store through the services provided in the application layer 204. Additionally, the document upload 212 interface may communicate with the user interface 210 to accept documents obtained from sources external to the system transmitted by a user as input and commit these input documents to the document store. Data and Analytics company APIs 214 provide API access to interfaces with companies that are third-party direct information suppliers, and other data providers to send information for verification or receive documents about a company, such as a supplier, for certification with the system. An ERP connector 216 provides REST API interfaces to applications from providers to push or receive documents, data and notifications. Additional Third-Party services 218 may be provided access in future iterations of the application layer 204.

Figure 3:
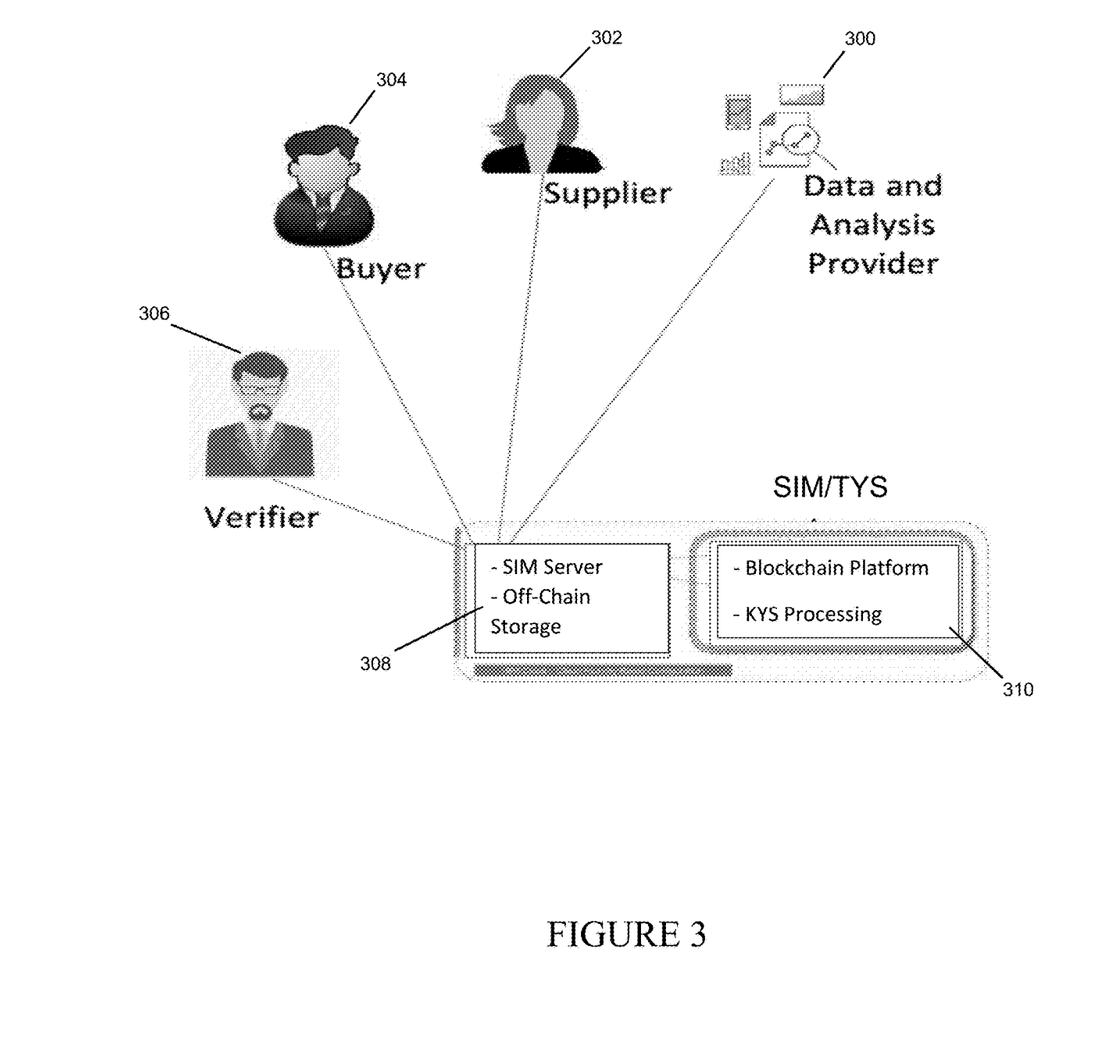
FIG. 3 is a view of persona interaction with the system consistent with certain embodiments of the present invention.

Turning now to FIG. 3, this figure presents a view of persona interaction with the system consistent with certain embodiments of the present invention. By way of example and not of limitation, this figure presents an implementation of the SIM system that will provide a Trust Your Supplier (TYS) result. In the TYS Application of the SIM system, organizations and personas contribute information to help optimize the vetting and verification of Supplier information for a Buyer that has not previously interacted with the Supplier. Information is received into the SIM server from several personas and outside information and analysis providers.

In an embodiment, Data and Analysis Providers 300 are business entities that capture and process information about business entities from various private and public sources. The Data and Analysis Providers 300 may run analytical algorithms against the data to generate insights. The Providers 300 then transmit and make available this data, information and insight to their subscribers which include Suppliers 302 and Buyers 304 who are interacting with the TYS Application. A Supplier 302 is a business entity that provides goods and/or services to one or more Buyers 304. In the normal course of business, prior to any business engagement a Supplier 302 must undergo an on-boarding process whereby the entity provides information about its business by answering questionnaires and providing evidence about claims made regarding business activity. A Buyer 304 is a business entity that purchases goods and/or services from trusted Suppliers 304 who have satisfactorily undergone and completed a verification process. A Verifier 306 represents individuals with credibility or license to practice and/or businesses that can verify and attest to the information that a business entity provides. In addition, Auditors/Regulators (not shown), as individuals or organizations, may contribute information gained from auditing or otherwise examining data, ledger, and regulatory integrity including good governance, audit and controls.

In an embodiment, One or more Data and Analysis Providers 300 commit data to the SIM server that is related to the Supplier 302 that is seeking to work with Buyers 304 with whom they have not previously interacted. The Data and Analysis Providers 300 will be transmitting data that supports the Supplier 302 in their onboarding activity. The Buyer 304, rather than performing an entire onboarding action with a new Supplier 302, may send a request to the TYS module to request any vetted and/or verified information about the new Supplier 302 maintained on the SIM server and in the SIM/TYS blockchain. Verifiers 306 transmit vetted and verified information about Suppliers and Buyers to the TYS Application.

In this embodiment, at 308 the TYS module collects all incoming information and requests from each source and commits all information to an electronic storage repository maintained by the SIM server. The SIM server may be active to replicate all received data and information and place the data and information into a replicated off-chain data store to better manage data security and prevent data corruption. At 310 the TYS Application will commit to the blockchain all data and actions that require immutable transactions on the distributed ledger. The TYS Application is then active to manage the interaction between Supplier 302, Buyer 304, Verifier 306. In this interaction the Buyer 304 may send a request for pre-vetted and verified information about a Supplier 302. This request is committed to the SIM/TYS blockchain as an immutable transaction. The information about the Supplier 302 maintained by the TYS Application may then be collected from both the SIM/TYS blockchain and off-chain data stores, along with the vetting and verification information, packaged and presented to the Buyer 304 to optimize the on-boarding of the new Supplier 302 by minimizing the amount of verification transactions the Buyer 304 must perform before arriving at a trusted relationship with the new Supplier 302 to begin business transactions between the Buyer 304 and the new Supplier 302.

In an additional embodiment, the Buyer 304 may request an update to information that has been vetted and verified previously, but may be out of date. The TYS Application may again collect and transmit information from the SIM/TYS blockchain and from off-chain sources, about the identified Supplier 302. Once again, permitting the Buyer 304 to minimize the amount of verification required to be performed by the Buyer 304 to re-certify the trusted relationship with the Supplier 304.

Figure 4:
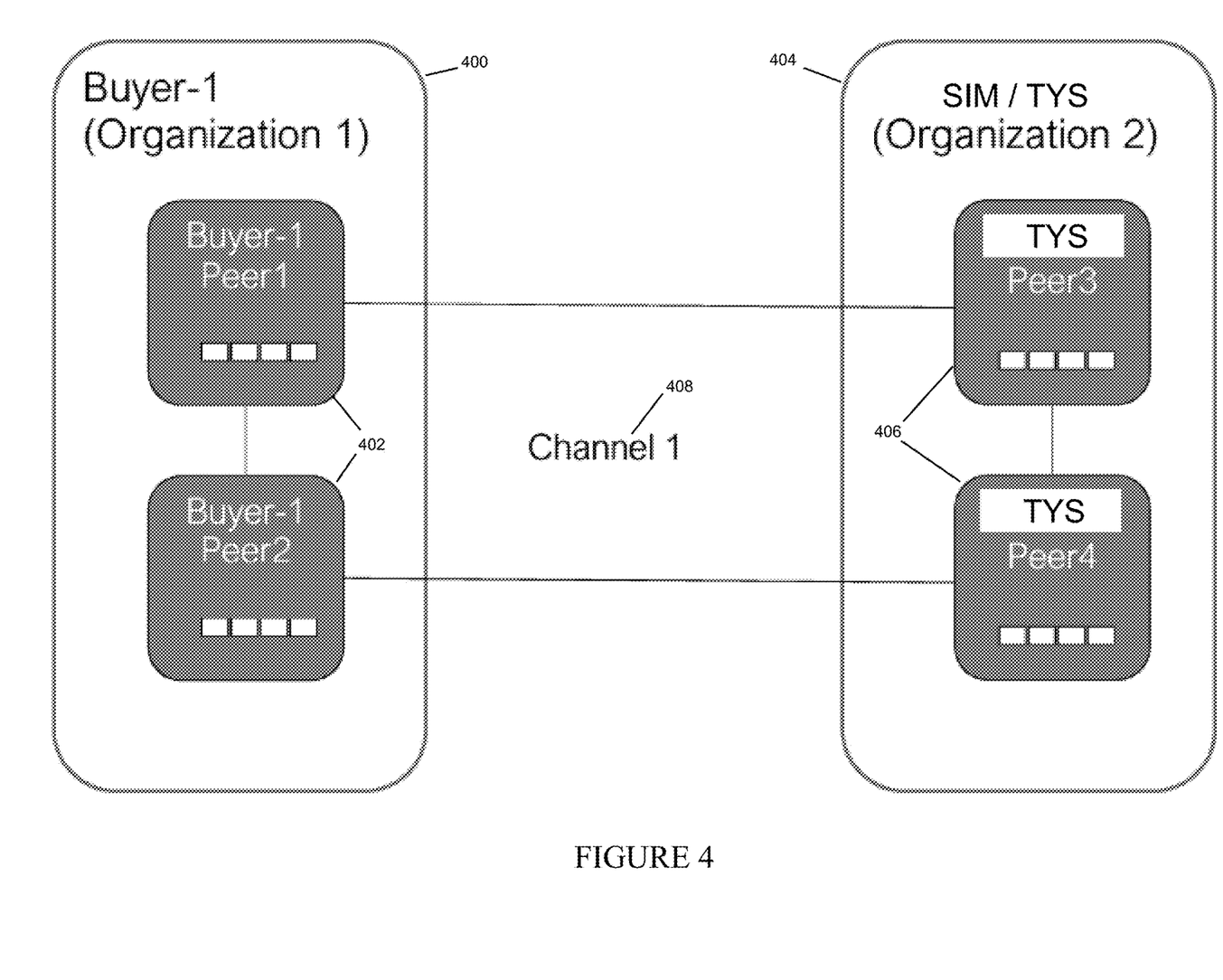
FIG. 4 is a view of organizations participating in the network consistent with certain embodiments of the present invention.

Turning now to FIG. 4, this figure presents a view of organizations participating in the network consistent with certain embodiments of the present invention. In an exemplary embodiment, the SIM/TYS application operates through the interaction among multiple organizations that comprise the business network. In a non-limiting example, a first organization 400, Buyer-1, may be a buyer that is interested in verified suppliers and have multiple Peers 402 established in a node that is in communication with the SIM/TYS organization node 404. The SIM/TYS node is a separate organization in the business network that serves as a trusted anchor and Network Operator. The SIM/TYS organization node may also operate multiple Peers 406 to establish and maintain communication and data transfer between the SIM/TYS organization node and other business nodes across established communication channels 408.

Figure 5:
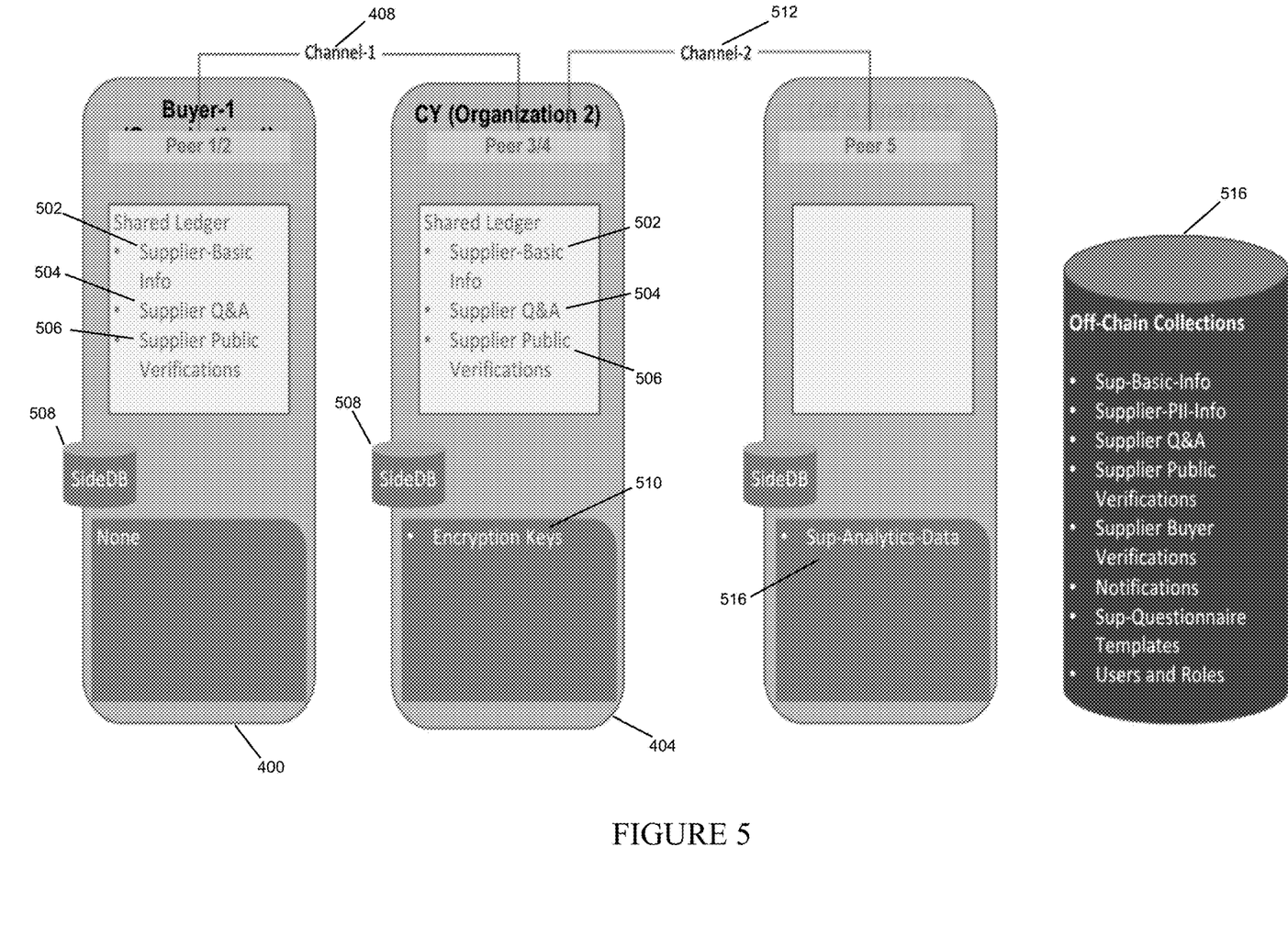
FIG. 5 is a view of peers and information distribution in the network consistent with certain embodiments of the present invention.

Turning now to FIG. 5, this figure presents a view of data and operation flow between organizations consistent with certain embodiments of the present invention. In an embodiment, a business organization 400, as represented in a non-limiting example by Buyer-1, may commit information to the shared TYS ledger. The information may consist of basic information about one or more Suppliers from whom the Buyer has purchased goods and/or services 502, Question and Answer documentation from one or more Suppliers 504, and Supplier public verifications of submitted data 506. Some or all of the information associated with each organization, such as Buyer-1, may be maintained in a Side Database 508 to provide for backup and recovery and data security. Buyer-1, as an organization, may be in contact with the SIM/TYS organization 404 through a data communication channel 408.

The SIM/TYS organization may have access to the shared TYS ledger containing all of the basic information about one or more Suppliers from whom the Buyer has purchased goods and/or services 502, Question and Answer documentation from one or more Suppliers 504, and Supplier public verifications of submitted data 506, as well as the data maintained in the Side Database 508. Additionally, to provide for data security the SIM/TYS organization may have a set of encryption keys 510 that have been generated by the TYS Application and managed and maintained on behalf of the SIM/TYS organization. The set of encryption keys 510 are used to encrypt information on the shared ledger. In a non-limiting example, the encryption keys generated by the TYS Application are dynamic, one-time use encryption keys.

The SIM/TYS organization may communicate across a separate data communication channel 512 to exchange information with a business organization 514, as represented by Peer-5, that maintains and manages Supplier Analytics Data 516. The Supplier Analytics Data 516 may be created by the TYS Application when analyzing aggregated data about Buyers and Suppliers. The resultant analytics data may be provided to organizations who either subscribe to the TYS Application or who request such analytics data under separate purchase order.

Additional information and transaction data may be maintained and managed by the SIM/TYS system in one or more off-chain data collections 518. The off-chain data collections 518 may contain, but are not limited to, information and transactions such as Supplier basic information, Supplier PII information, Supplier Q&A responses, Supplier public verifications, Supplier Buyer verifications, Notifications, Supplier Questionnaire templates, users, roles, and other information that may be deemed as necessary information by the SIM/TYS system.

Figure 6:
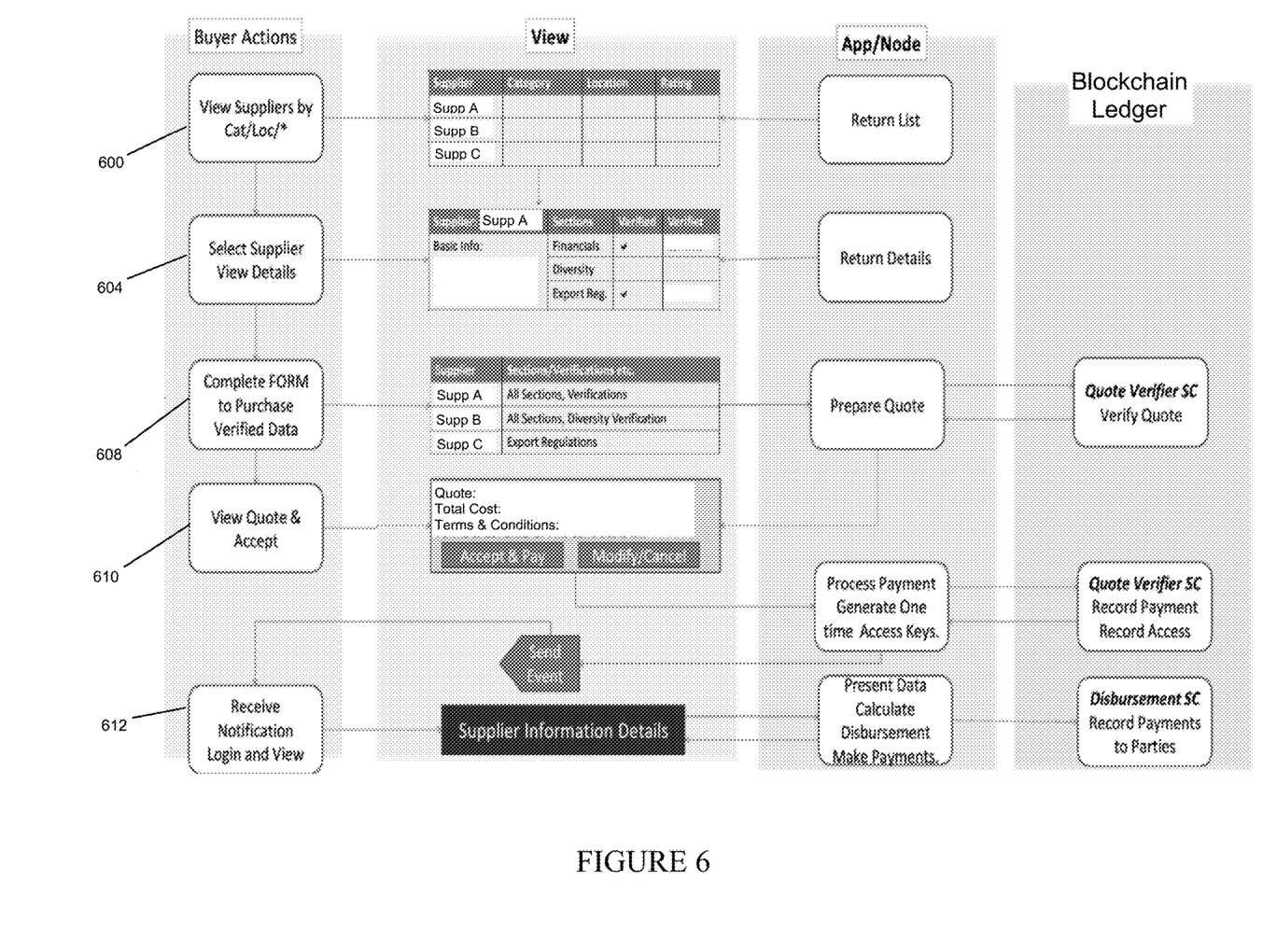
FIG. 6 is a view of the process of a buyer purchasing supplier information consistent with certain embodiments of the present invention.

Turning now to FIG. 6, this figure presents a view of the process of a buyer purchasing supplier information consistent with certain embodiments of the present invention. In an exemplary implementation, a Buyer may purchase information about a Supplier from the TYS Application. In an initial action, at 600 a Buyer may log into the secured User Interface and place a request to view one or more Suppliers whose verified information has been uploaded to the TYS Application within the SIM system. The TYS Application may then return a list of Suppliers that meet the parameters of the request input by the Buyer. At 604, the Buyer may review the list of Suppliers and choose a Supplier that meets with their approval. The TYS Application receives the selected Supplier identification and retrieves detailed information about the selected Supplier. The Buyer is presented with the detailed information about the Supplier, what information has been verified and the identity of the verification individual or organization. The Buyer may also be presented with a form to request purchase of the verified information.

At 608, the Buyer completes the purchase request form, which may include one or more options for level and quantity of verified Supplier information that is available for purchase. The form is sent from the Buyer to the TYS Application. The TYS Application prepares a quote and transmits this quote to a quote verifier module. The quote verifier module ensures that the details of the quote are accurate and places the quote as an immutable transaction on the TYS blockchain. The verified and stored quote is then transmitted to the Buyer.

At 610, the Buyer may view the verified quote. If the Buyer chooses to accept the quote from the TYS Application they are presented with a payment screen. If the Buyer decides that the quote is not acceptable, the Buyer may have the option to modify the request for quote and receive an updated quote, or to cancel the request for quote. If the Buyer chooses to modify the request for quote, the TYS Application will update the quote, transmit the quote to the quote verifier, the quote verifier will once again validate the quote and commit the updated quote as an immutable transaction to the TYS blockchain. The updated quote will then be presented to the Buyer for further action. If the Buyer chooses to cancel the quote, the TYS Application will commit the quote cancelation action to the blockchain and the Buyer will be returned to the select Supplier display on the UI.

At 612, when presented with the payment screen, the Buyer sends payment information to the TYS Application for payment processing. The TYS Application processes the payment by first transmitting the payment information to the Quote verifier. The Quote verifier verifies that the payment information is valid, secures an approval indication for payment, commits the payment record to the blockchain, and sends an approval for record access to the TYS Application. The TYS Application received the approval for record access and dynamically generates a set of one-time access keys. The Buyer receives an event notification from the TYS Application along with the set of one-time access keys. The Buyer may then log into the Supplier information view display by inputting the one-time access keys to receive and view the verified Supplier information details.

When the Buyer logs into the secure view for the Supplier information details, the participants in the SIM/TYS system who have provided information may be due payments for the verified data and/or verification actions they have provided. The TYS Application will calculate what disbursements are necessary, and to whom the disbursements are to be paid. The TYS system will then make the payments to the deserving parties and commit a record of the parties and the payments to those parties to the blockchain as immutable transactions on the blockchain and associate these payments with a particular Buyer.

Figure 7:
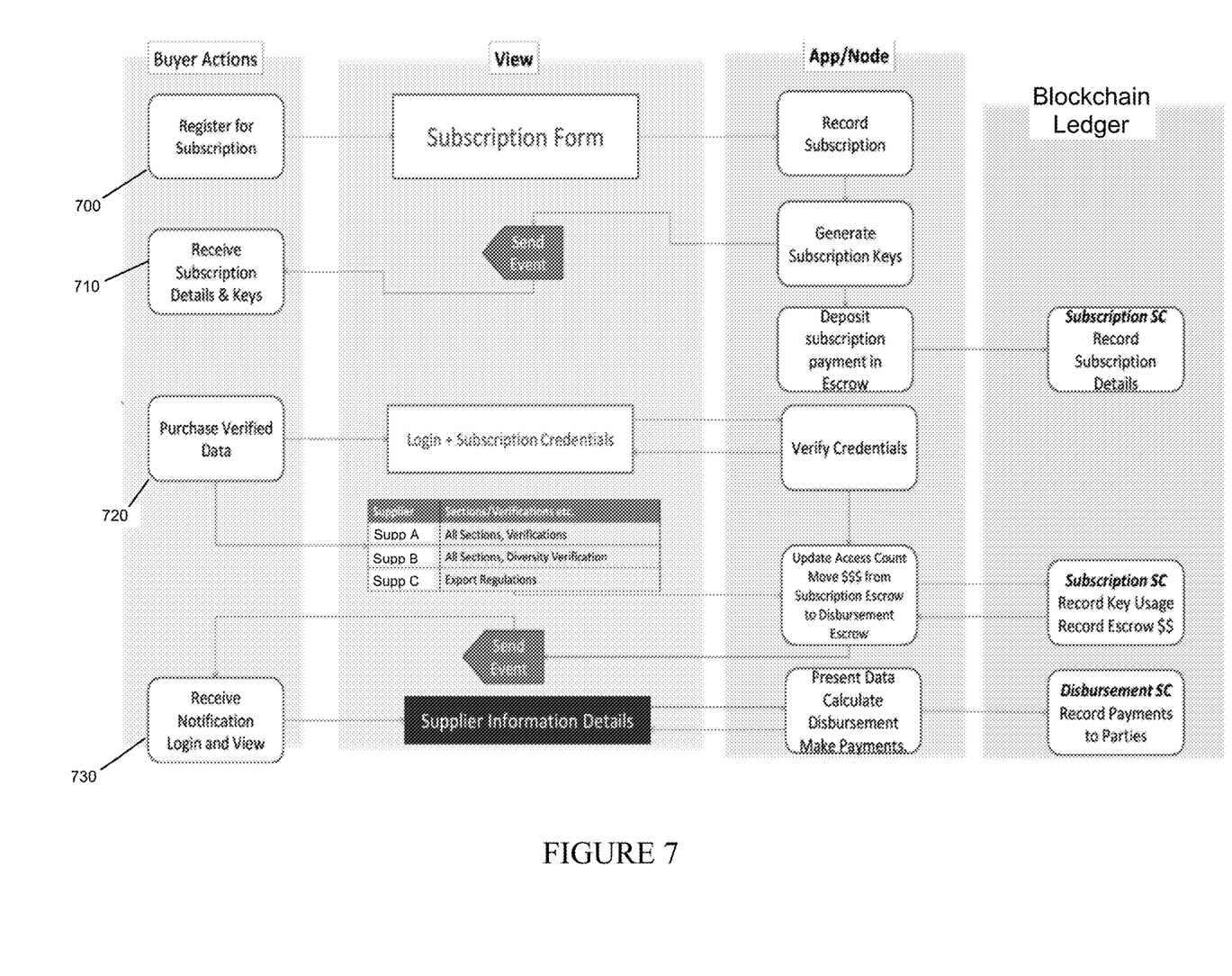
FIG. 7 is a view of the subscription model of participation consistent with certain embodiments of the present invention.

Turning now to FIG. 7, this figure presents a view of the process of a buyer purchasing a subscription to access to the TYS Application consistent with certain embodiments of the present invention. In an exemplary implementation, a Buyer may purchase information about a Supplier from the TYS Application as a subscriber to the SIM/TYS system. If the Buyer is not yet a subscriber to the SIM/TYS system at 700 the Buyer may first register to become a subscriber to the TYS Application by logging into the SIM/TYS system and requesting a subscriber form. The Buyer is presented with a subscription form on the UI display. Once the Buyer has completed the subscription form and transmitted it to the SIM/TYS system, the TYS Application will record the subscription in the system. The TYS Application may then generate a set of encrypted subscription keys for the Buyer. The TYS Application will send a notification to the Buyer. Upon selection of the notification message, the Buyer will receive the generated subscription keys and details about the subscription and payment of the subscription fee from the TYS Application at 710. The TYS Application will receive the subscription payment from the Buyer and place the payment into an escrow account. The TYS Application will then record the subscription and all subscription details to the blockchain in one or more immutable transactions.

At 720 a Buyer who has an active subscription to the SIM/TYS system may log in to the system to purchase vetted and verified information about a Supplier. The Buyer initiates the action by entering the login and subscription credentials supplied by the TYS Application. The TYS Application verifies the Buyers login and subscription credentials. If the credentials are not verified, either because of lapse, lack of payment, or other invalidating condition, the Buyer is locked out of the system until the condition is remedied. If the credentials are verified, the Buyer is presented with a list of Suppliers from which the Buyer may request vetted and verified information. Upon the selection of at least one Supplier for which a Buyer would like to receive information, funds are moved from the subscription escrow account to a disbursement escrow account. The TYS Application also records the Buyer key usage and a record of the escrow transfer to the blockchain in an immutable transaction.

At 730, the Buyer receives an event notification from the TYS Application that the Supplier information that the Buyer has requested is available for viewing. The Buyer may then log into the secure login UI page and view the vetted and verified Supplier information on the UI display. As in the direct purchase mode, the participants in the SIM/TYS system who have provided information may be due payments for the verified data and/or verification actions they have provided. The TYS Application will calculate what disbursements are necessary, and to whom the disbursements are to be paid. The TYS system will then make the payments to the deserving parties and commit a record of the parties and the payments to those parties to the blockchain as immutable transactions on the blockchain and associate these payments with a particular Buyer.

While certain illustrative embodiments have been described, it is evident that many alternatives, modifications, permutations and variations will become apparent to those skilled in the art in light of the foregoing description.

We claim:

1. A system for digital identity management, comprising:
one or more processors;
one or more computer-readable memories storing program instructions when executed by said one or more processors, cause said one or more processors to perform operations comprising:
managing one or more distributed ledgers;
receiving and aggregating verified business information from one or more supplier business organizations to create a verified business information collection;
receiving and aggregating verification information for said verified business information collection directly from a business information verification provider;
committing said verified business information collection and said aggregated verification information to said one or more distributed ledgers;
storing said verified business information collection and said aggregated verification information in an off-chain storage;
providing controlled access to a buyer business organization to combined information supplied by said one or more supplier business organizations and said business information verification provider, wherein said combined information comprises said verified business information collection and said aggregated verification information;
utilizing an artificial intelligence (AI) engine to analyze said combined information stored in said one and more distributed ledgers and said off-chain storage and actively notifying said one or more supplier business organizations to provide needed updates to supplier information;
receiving said updates from said one or more supplier business organizations and recording said received updates to said one or more distributed ledgers and said off-chain storage;
matching said supplier information with requirements associated with said buyer business organization via utilizing said AI engine; and
responsive to matching said supplier information with said requirements associated with said buyer business organization, providing identification of a new supplier business organization to said buyer business organization and optimizing onboarding of said new supplier business organization to said buyer business organization.

2. The system according to claim 1, wherein said one or more distributed ledgers comprises one or more provisioned blockchains.

3. The system according to claim 2, wherein said provisioned blockchains are privately provisioned.

4. The system according to claim 1, wherein said verified business information is comprised of answers to questionnaires about business capabilities.

5. The system according to claim 4, wherein said verification information is comprised of evidence verifying and attesting to the accuracy of said business information.

6. The system according to claim 1, wherein said controlled access comprises providing such access through a commercial transaction between said buyer business organization and one of said one or more supplier business organizations wherein said commercial transaction is managed by said one or more processors.

7. The system according to claim 6, wherein said commercial transaction returns business information, verification information, and other third-party information retrieved from said one or more blockchains in a template format.

8. The system according to claim 1, wherein said buyer business organization is a buyer of goods and services.

9. The system according to claim 1, wherein said one or more supplier business organizations are suppliers of goods and services.

10. The system according to claim 1, wherein said controlled access is implemented by generating a set of one-time use encrypted keys and providing said one-time use encrypted keys to said buyer business organization.

* * * * *